Nov. 5, 1929.  R. E. BIERD ET AL  1,734,194
STABILIZER
Filed June 22, 1926
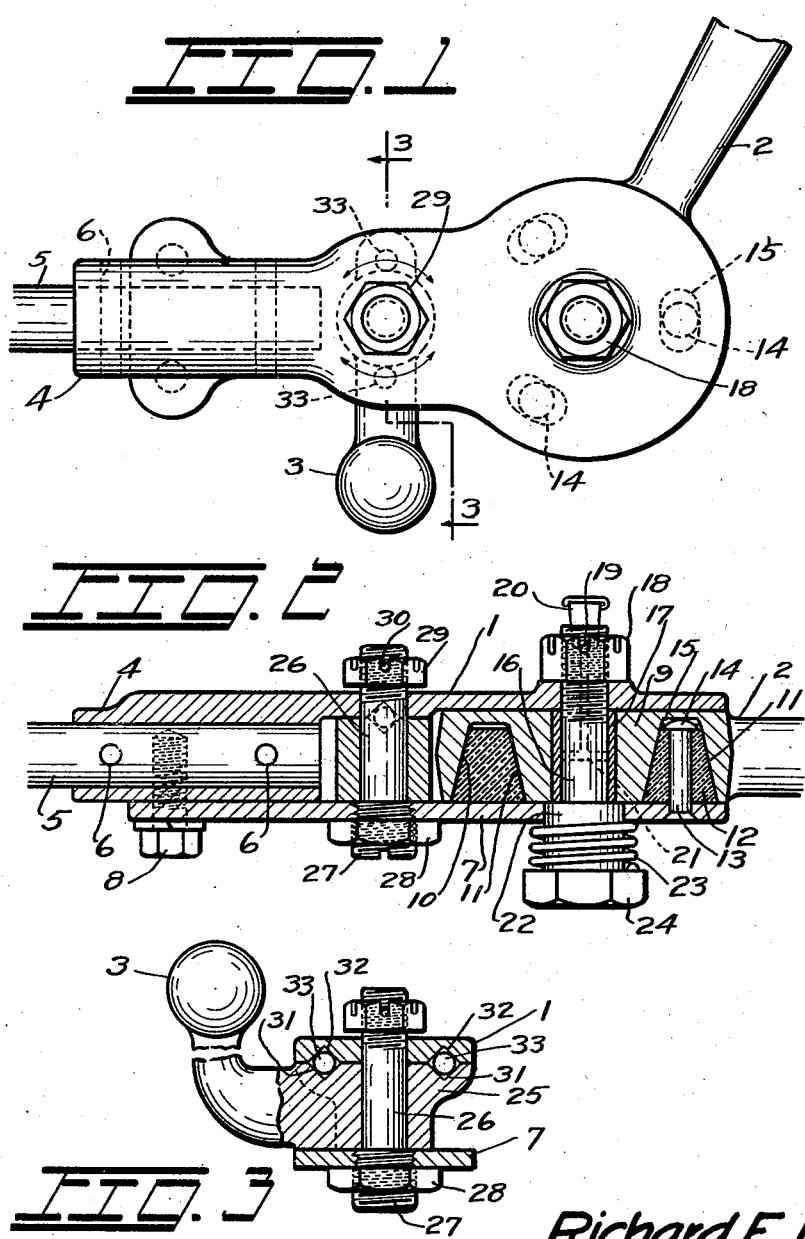
Inventor
Richard E. Bierd
John H. Patterson
By Harry Bowen
Attorney Patented Nov. 5, 1929

1,734,194

UNITED STATES PATENT OFFICE

RICHARD E. BIERD AND JOHN H. PATTERSON, OF SEATTLE, WASHINGTON

STABILIZER

Application filed June 22, 1926. Serial No. 117,771.

The invention is a friction attachment that may be inserted in the steering gear of a motor vehicle at the ends of the spindle connecting rod to prevent the transmission of vibration of the wheel to the steering wheel.

The object of the invention is to provide means for stabilizing the steering gear of a motor vehicle.

Another object of the invention is to provide stabilizing means for the steering gears of motor vehicles which may readily be installed.

A further object of the invention is to provide a stabilizer for motor vehicles, which throws itself out of engagement as soon as the steering wheel is turned an appreciable amount.

A further object of the invention is to provide a stabilizer for motor vehicles which provides conical shaped friction engaging members.

A still further object of the invention is to provide a stabilizer for motor vehicles which has frictional contact and in which the friction may be readily adjusted.

And a still further object of the invention is to provide a frictional stabilizer for motor vehicles which is of a simple and economical construction.

Other features and advantages of the invention will appear from the following description taken in connection with the drawings, wherein:—

Figure 1 is a plan view of the device showing it as it would appear when attached to the right hand end of the spindle connecting rod.

Figure 2 is a longitudinal section through the device shown in Figure 1.

Figure 3 is a cross section on line 3—3 of Figure 1.

In the drawings the device is shown as it would be made wherein numeral 1 indicates the casing, numeral 2 the spindle arm, and numeral 3 the ball to which the steering gear connecting rod is attached.

The casing 1 is substantially made of a flat plate having a hub 4 at one end in which the spindle connecting rod as indicated by the numeral 5 is held by pins or bolts 6.

Another plate 7 is attached to the lower side of the casing and held to the hub by bolts 8 as shown in Figure 2.

The hub 9 of the spindle arm 2 is held between these plates as shown and it will be observed that the under side of the hub is provided with a groove 10, having inclined sides 11 which engage a similarly shaped ring 12 that is held to the plate 7 by rivets 13. The upper ends of the rivets are provided with round heads 14, which co-operate with recesses 15 in the hub 9. It will be observed that the rivet heads are normally free, but that, as soon as the hub is slightly turned in relation to the plate the rivet heads will engage the surface of the bottoms of the groove in the hub 9 and it will be observed that the joint will immediately become free to rotate. The hub is mounted on a pin 16 that may be provided with a bushing 17, and the upper end of the pin 16 is provided with a nut 18 that may be locked in position by a pin 19. This end of the pin is also provided with an oil cup 20 which supplies oil to an internal opening 21 to lubricate the pin. The head of the pin is provided with a shoulder 22 upon which a spring 23 is mounted and a head 24 which holds the outer end of the spring. It will be observed that the spring will normally hold the plates in frictional engagement with the hub, and the amount of the friction may readily be adjusted by turning the nut.

The ball 3 is mounted on a member 25 and although the ball is shown in an upward position, it is understood that it may extend downward or outward, or in any suitable position. The member 25 is mounted between the plates 1 and 7 and held by a pin 26, the lower end of which is provided with a threaded shank 27 which screws into the plate 7, and is held by a lock nut 28. The upper end of the pin 26 is also threaded and provided with a nut 29 which may be held by a pin 30. The member 25 is provided with V shaped openings 31 that correspond with similar V shaped openings 32 in the plate 1 and it will be observed that as the member 25 is rotated on the pin 26, balls 33 in the V shaped openings will engage the surfaces of the openings and spread the plates to relieve the friction between the hub 9 and the plates while the steering wheel is being rotated to steer the vehicle. It is also understood that the member 25 to which the ball 3 is attached may be of any suitable shape or design.

It is understood that other changes may be made in the construction without departing from the spirit of the invention. One of which changes may be in the design or arrangement of the casing, another may be in the shape of the frictional groove, another may be in the use of other means for producing and adjusting the friction, and still another may be in the use of other means for attaching the arms or rods to the device.

The construction will be readily understood from the foregoing description. To use the device, it may be assembled as shown, and installed by removing the connections at one end of the spindle connecting rod and placing the end of the rod in the device as shown and described. The spindle arm may be provided with a hub as shown and held between the plates as shown and described. The steering gear connecting rod may then be attached to the ball 3. It will then be observed as this joint is frictionally held, it will absorb practically all play and vibrations from the road wheels. It therefore provides a rigid connection which at the same time automatically releases to permit easy steering by spreading the plates and relieving the friction as soon as the wheel is turned slightly.

Having thus fully described the invention, what we claim as new and desire to secure by Letters Patent, is:—

1. In a device of the class described, a casing comprising an upper and lower plate with a hub at one side, a spindle arm frictionally held between the upper and lower plate of the said casing, a spring pin resiliently holding the upper and lower plates of the casing against the said spindle arm, pins with rounding heads in one of the plates of the said casing extending into elongated slots in the said spindle arm, the rounded heads of the said pins being adaptable to pass out of the said elongated slots as the movement of the said spindle arm exceeds the length of the slots, the said rounded heads thereby spreading the plates of the said casing and relieving the said friction means thereby permitting a compartively free movement of the said spindle arm after it has moved a predetermined amount, another arm pivotally mounted between the upper and lower plates of the said casing, said latter arm and casing having a plurality of recesses, and balls in the said recesses, said recesses being provided with sloping sides which will cooperate with the balls to spread the upper and lower plates of the casing when the latter arm is moved about its pivot thereby providing secondary means for spreading the plates of the casing and relieving the friction of the spindle arm.

2. In a stabilizer for the steering gear of a motor vehicle, two parallel plates having a hub attached to their edges at one side, a spindle arm, a hub on the said spindle arm, means for frictionally holding the hub between the said plates, another arm also having a hub pivotally mounted between the said plates, balls in recesses in the hub of the said latter arm cooperating with recesses in one of the said plates to spread the said plates and relieve the friction on the hub of the said spindle arm, and means for resiliently holding the said plates against the hub of the said spindle arm.

3. In a stabilizing device, a hub that may readily be attached to the spindle connecting rod of the motor vehicle, said hub having a plurality of parallel plates extending therefrom, adjustable means for resiliently holding the plates together, a hub pivotally mounted between plates having an arm with a ball at the outer end extending therefrom, one surface of the said hub and the corresponding surface of one of the said plates having corresponding V shaped slots therein, balls in the said slots, another hub pivotally mounted between the said plates having a groove therein, and a spindle arm extending therefrom, a friction washer attached to one of the parallel plates and engaging the groove in the said hub, and means for relieving the friction of the said friction washer as the latter hub is slightly rotated.

In testimony whereof we affix our signatures.

RICHARD E. BIERD.
JOHN H. PATTERSON.